United States Patent
Zhang et al.

(10) Patent No.: US 11,937,098 B2
(45) Date of Patent: Mar. 19, 2024

(54) SPATIAL RELATION AND PATHLOSS REFERENCE SIGNAL FOR MULTI-TRP OPERATION

(71) Applicant: Apple Inc., Cupertino, CA (US)

(72) Inventors: Yushu Zhang, Beijing (CN); Dawei Zhang, Saratoga, CA (US); Haitong Sun, Cupertino, CA (US); Hong He, San Jose, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 249 days.

(21) Appl. No.: 17/593,448

(22) PCT Filed: May 14, 2020

(86) PCT No.: PCT/CN2020/090263
§ 371 (c)(1),
(2) Date: Sep. 19, 2021

(87) PCT Pub. No.: WO2021/226933
PCT Pub. Date: Nov. 18, 2021

(65) Prior Publication Data
US 2022/0303788 A1  Sep. 22, 2022

(51) Int. Cl.
*H04W 16/28* (2009.01)
*H04L 5/00* (2006.01)
(Continued)

(52) U.S. Cl.
CPC ........... *H04W 16/28* (2013.01); *H04L 5/0051* (2013.01); *H04W 52/242* (2013.01);
(Continued)

(58) Field of Classification Search
CPC ... H04W 16/28; H04W 52/242; H04W 72/02; H04W 72/044; H04W 72/1263; H04L 5/0051
See application file for complete search history.

(56) References Cited

U.S. PATENT DOCUMENTS

2021/0321379 A1 * 10/2021 Cirik ................... H04W 72/044
2022/0385415 A1 * 12/2022 Matsumura ........... H04L 5/0096
(Continued)

FOREIGN PATENT DOCUMENTS

CN   110536452   12/2019
CN   111082909    4/2020
(Continued)

OTHER PUBLICATIONS

Oppo, "Discussion on Multi-beam Operation Enhancements"; 3GPP TSG RAN WG1 #98bis; R1- 1910117; Oct. 4, 2019; 11 sheets.
(Continued)

*Primary Examiner* — Chae S Lee
(74) *Attorney, Agent, or Firm* — Fay Kaplun & Marcin, LLP (57) ABSTRACT

A user equipment (UE) in a multiple transmission and reception point (multi-TRP) configuration having simultaneous connections with a first next generation node B (gNB) and at least one second gNB over a same carrier. The UE divides uplink (UL) resources into a plurality of groups, determines a spatial relation and a pathloss reference signal (RS) for each one of the plurality of groups based on a transmission configuration indication (TCI) indicating a quasi-co-location (QCL) source RS for a downlink channel and transmits UL data on the UL resources corresponding to each one of the plurality of groups to a respective one of the first gNB or the at least one second gNB.

15 Claims, 4 Drawing Sheets

(51) Int. Cl.
  *H04W 52/24*    (2009.01)
  *H04W 72/02*    (2009.01)
  *H04W 72/044*   (2023.01)
  *H04W 72/1263*  (2023.01)

(52) U.S. Cl.
  CPC ......... *H04W 72/02* (2013.01); *H04W 72/044* (2013.01); *H04W 72/1263* (2013.01)

(56) References Cited

U.S. PATENT DOCUMENTS

2023/0041109 A1* 2/2023 Ling ................. H04W 72/1268
2023/0209567 A1* 6/2023 Grossmann ........... H04L 5/0051
                                                              370/329

FOREIGN PATENT DOCUMENTS

| CN | 111083942 | 4/2020 |
| JP | 2019047375 | 3/2019 |
| WO | 2019/219162 | 11/2019 |
| WO | 2020/034567 | 2/2020 |

OTHER PUBLICATIONS

Apple Inc., "Remaining Issues on Multi-beam operation"; 3GPP TSG RAN WG1 #100-e; R1-2000860; Feb. 15, 2020; 12 sheets.

MediaTek Inc.: "Remaining issues on multi-beam operation", 3GPP TSG RAN Wgi #100bis, R1-2001823, Apr. 30, 2020, 9 sheets.

3GPP: "Radio Resource Control (RRC) protocol specification (Release 16)", 3GPP TS 38.331 V16.0.0 (Mar. 2020), Apr. 6, 2020, 835 sheets.

Fraunhofer IIS et al.: "Enhancements on UE multi-beam operation", 3GPP TSG RAN WG1 Meeting #99, R1-1912664, Nov. 22, 2019, 5 sheets.

ZTE: "Enhancements on multi-beam operation", 3GPP TSG RAN WG1 Meeting #98, R1-1908192, Aug. 30, 30, 2019, 26 sheets.

* cited by examiner

Slot
Option 2-1

Fig. 4a

Slot
Option 2-2

SPATIAL RELATION AND PATHLOSS REFERENCE SIGNAL FOR MULTI-TRP OPERATION

BACKGROUND INFORMATION

Multiple transmission and reception point (multi-TRP) functionality in 5G New Radio (NR) involves a UE maintaining multiple links with multiple TRPS (e.g. multiple gNBs) simultaneously on the same carrier. In the development of 5G NR, various cases are defined where a spatial relation and a pathloss reference signal are not configured and default parameters are used based on a transmission and configuration indication (TCI) included in a downlink (DL) transmission. However, the default parameters may be specific to a particular TRP. Thus, multi-TRP may not be supported for these cases.

SUMMARY

In some exemplary embodiments a method is performed by a user equipment (UE) in a multiple transmission and reception point (multi-TRP) configuration having simultaneous connections with a first next generation node B (gNB) and at least one second gNB over a same carrier. The method includes dividing uplink (UL) resources into a plurality of groups, determining a spatial relation and a pathloss reference signal (RS) for each one of the plurality of groups based on a transmission configuration indication (TCI) indicating a quasi-co-location (QCL) source RS for a downlink channel and transmitting UL data on the UL resources corresponding to each one of the plurality of groups to a respective one of the first gNB or the at least one second gNB.

Other exemplary embodiments are related to a user equipment (UE) having a transceiver and a processor. The transceiver is configured to simultaneously connect with a first next generation node B (gNB) and at least one second gNB over a same carrier in a multiple transmission and reception point (multi-TRP) configuration. The processor is configured to divide uplink (UL) resources into a plurality of groups, and determine a spatial relation and a pathloss reference signal (RS) for each one of the plurality of groups based on a transmission configuration indication (TCI) indicating a quasi-co-location (QCL) source RS for a downlink channel. The transceiver is further configured to transmit UL data on the UL resources corresponding to each one of the plurality of groups to a respective one of the first gNB or the at least one second gNB.

In still further exemplary embodiments a method is performed by a user equipment (UE) in a multiple transmission and reception point (multi-TRP) configuration having simultaneous connections with a first next generation node B (gNB) and at least one second gNB over a same carrier. The method includes determining a spatial relation and a pathloss reference signal (RS) for uplink (UL) resources based on a transmission configuration indication (TCI) indicating a quasi-co-location (QCL) source RS for a downlink channel and a time domain behavior of the UL resources and transmitting UL data on the UL resources to each one of the first gNB and the at least one second gNB.

Additional exemplary embodiments are related to a user equipment (UE) having a transceiver and a processor. The transceiver is configured to simultaneously connect with a first next generation node B (gNB) and at least one second gNB over a same carrier in a multiple transmission and reception point (multi-TRP) configuration. The processor is configured to determine a spatial relation and a pathloss reference signal (RS) for uplink (UL) resources based on a transmission configuration indication (TCI) indicating a quasi-co-location (QCL) source RS for a downlink channel and a time domain behavior of the UL resources. The transceiver is further configured to transmit UL data on the UL resources to each one of the first gNB and the at least one second gNB.

DETAILED DESCRIPTION

The exemplary embodiments may be further understood with reference to the following description and the related appended drawings, wherein like elements are provided with the same reference numerals. The exemplary embodiments are described with respect to default spatial relation and pathloss reference signal (RS) configurations for a UE in a multi-TRP operation.

Multiple transmission and reception point (multi-TRP) functionality involves a UE maintaining multiple links with multiple TRPS (e.g. multiple gNBs) simultaneously on the same carrier. However, multi-TRP is not supported in the 3GPP Rel-16 standards for certain scenarios where a default spatial relation and pathloss reference signal is not configured for the Physical Uplink Control Channel (PUCCH) or sounding reference signals (SRS). In Rel-16, in some scenarios to be described in detail below, the default spatial relation and pathloss reference signal may be applied by a UE only for a single beam targeting a single TRP. The exemplary embodiments describe default spatial relation and pathloss RS configurations for multiple beams targeting multiple TRPs.

Figure 1:
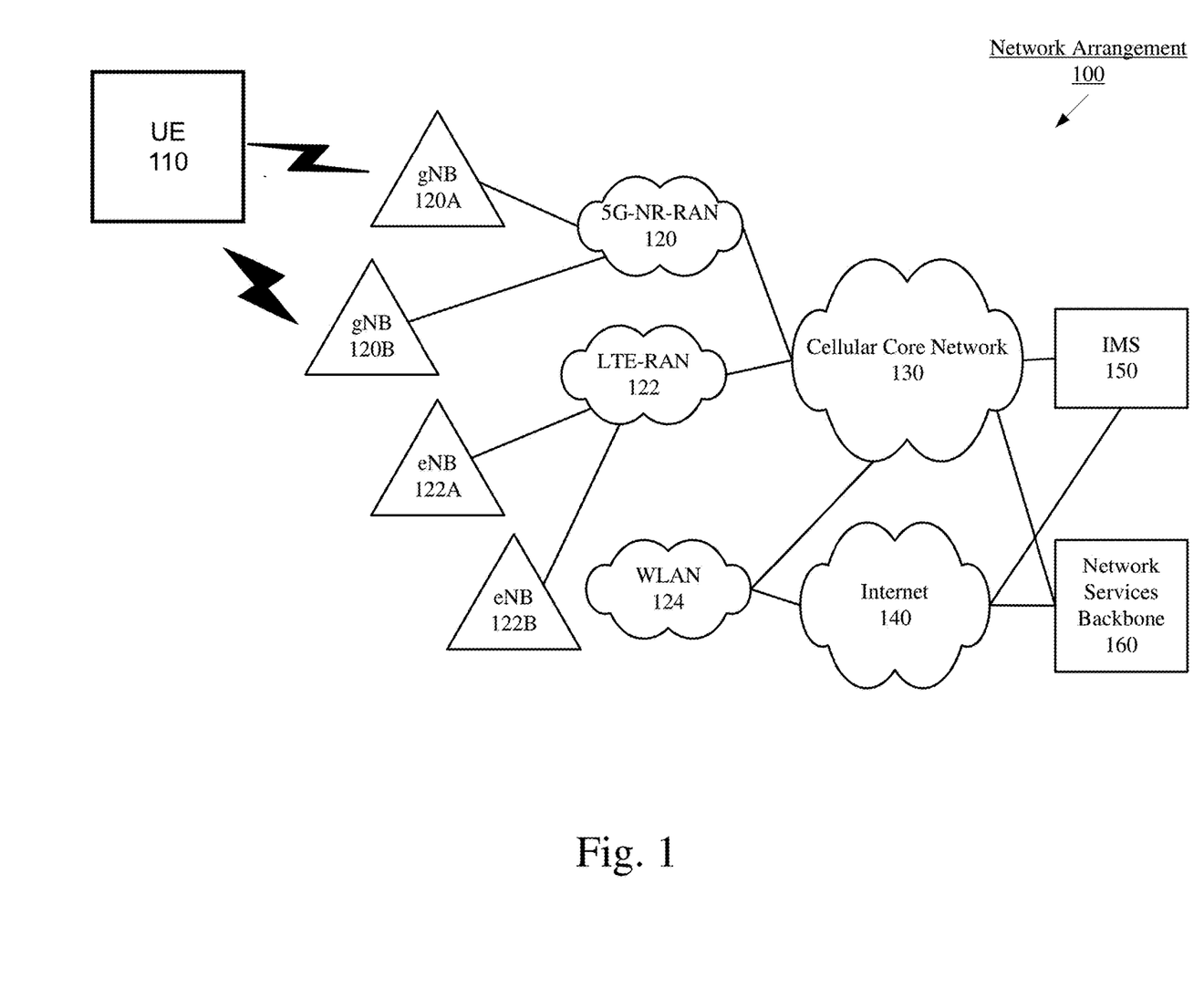
FIG. 1 shows a network arrangement according to various exemplary embodiments.

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary embodiments, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNB 120A, 120B is merely for illustrative purposes. The exemplary embodiments may apply to any appropriate number of gNBs. Specifically, the UE 110 may simultaneously connect to and exchange data with a plurality of gNBs 120A, 120B in a multi-cell CA configuration or a multi-TRP configuration. The UE 110 may also connect to the LTE-RAN 122 via either or both of the eNBs 122A, 122B, or to any other type of RAN, as mentioned above. In the network arrangement 100, the UE 110 is shown as having a simultaneous connection to the gNBs 120A and 120B. The connections to the gNBs 120A, 120B may be, for example, multi-TRP connections where both of the gNBs 120A, 120B provide services for the UE 110 on a same channel.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
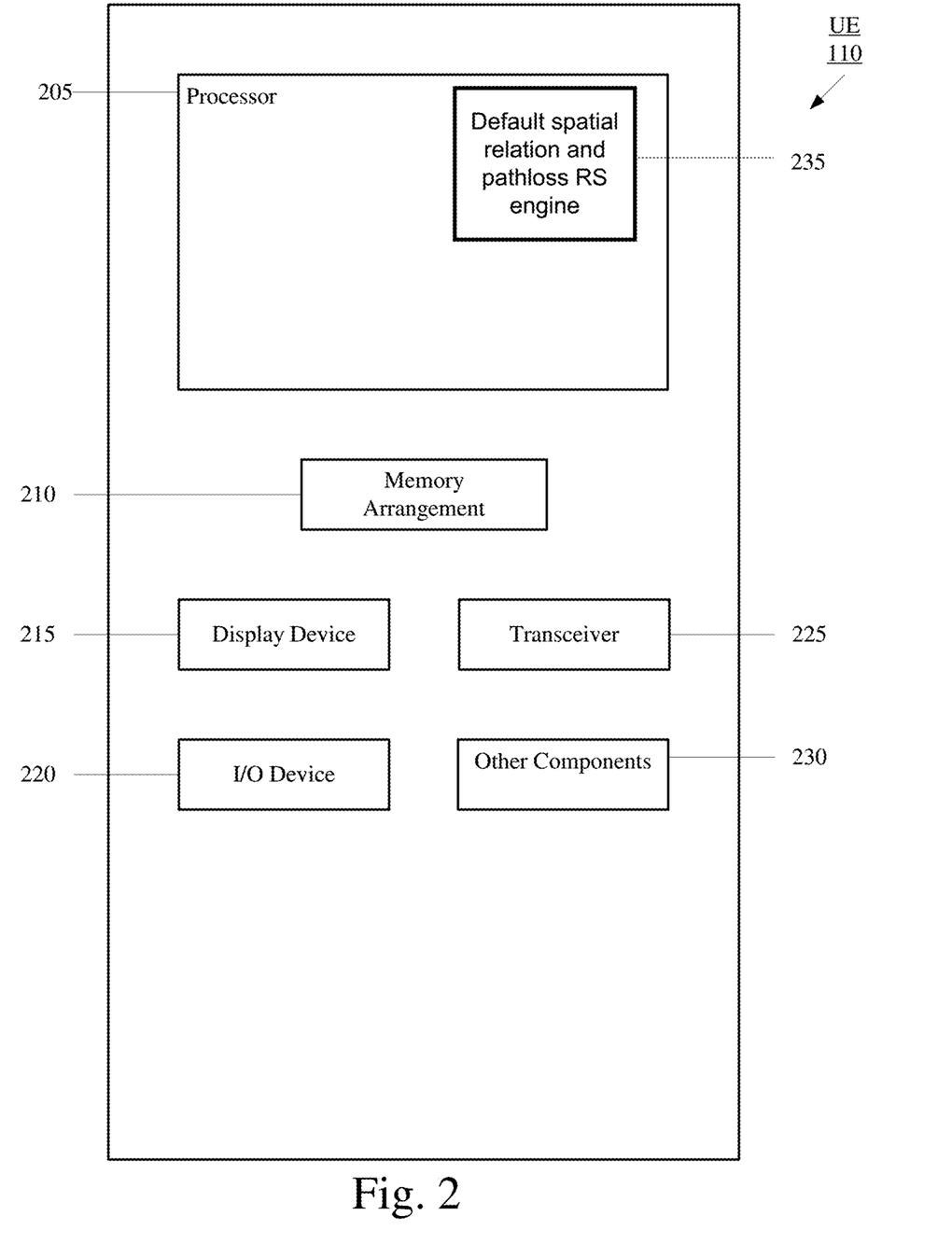
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a default spatial relation and pathloss RS engine 235. The default spatial relation and pathloss RS engine 235 may perform operations including determining a spatial relation and pathloss reference signal for PUCCH resources when the UE 110 is in a multi-TRP configuration with a plurality of gNBs and using the same resources for both connections. The specific determines for various scenarios will be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

In Rel-15, the downlink beam indication is based on a Transmission and Configuration Indication (TCI), which indicates the quasi-co-location (QCL) source reference signal for a downlink channel (PDSCH, PDCCH). Two antenna ports are considered to be quasi-co-located if properties of the channel over which a symbol on one antenna port is conveyed can be inferred from the channel over which a symbol on the other antenna port is conveyed. Thus, the QCL concept may help the UE with calculations, including channel estimation, by avoiding calculations for both antenna ports separately. A gNB may indicate that an antenna port used by a specific CSI reference signal (CSI-RS) is QCL with the antenna port used for e.g., a PDSCH or PDCCH transmission.

The QCL source RS may be a synchronization signal block (SSB) or a CSI-RS. In Rel-15, the uplink (UL) beam indication is based on spatial relation information, where the source reference signal may be based on SSB, CSI-RS or a sounding reference signal (SRS). When SSB, CSI-RS or SRS is indicated, the UE may use the same beam to transmit the UL signal as that used to receive the SSB/CSI-RS/SRS.

As defined in NR, a control resource set (CORESET) is a set of resource element groups (REG) of resource elements within which the UE attempts to blindly decode downlink control information. In other words, the CORESET is a set of physical resources (e.g., a specific area on NR Downlink Resource Grid) and a set of parameters that is used to carry PDCCH/DCI. The CORESET, when configured, may be used to derive a spatial relation and pathloss information.

In Rel-16, default QCL/spatial relations are defined for various cases. However, these default QCL/spatial relations are inapplicable to the multiple transmission and reception point (multi-TRP) functionality. In Rel-16, the multi-TRP functionality is supported with a basic beam management framework. The beam management framework includes an ability for a UE to receive downlink signals from multiple gNBs deployed with ideal backhaul or non-ideal backhaul. A UE may be indicated with two downlink TCI states for a PDSCH. A PDCCH from different TRPs may be carried by a CORESET having different values of a CORESET-poolIndex. In contrast, in Rel-17, the beam management enhancement for multi-TRP operation is to be supported so that a UE may receive downlink signals from multiple gNBs with multiple panels/beams and report or transmit UL signals to gNBs based on panel selection to any of the TRPs.

Figure 3:
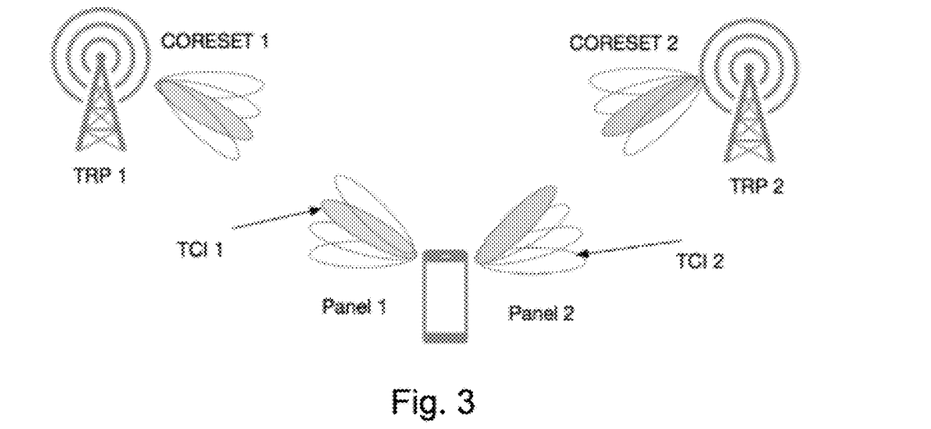
FIG. 3 shows a network arrangement with a UE in multi-TRP operation.

Multi-TRP operation is not supported for the default spatial relation and pathloss reference signal cases discussed in Rel. 16 because the CORESET or active TCI state with lowest ID will always be from a particular TRP. Thus, a UE will apply only a single beam targeting to a single TRP. FIG. 3 shows a network arrangement 300 with a UE in multi-TRP operation where the default spatial relation and pathloss RS is based on the RS in TCI 1 from CORESET 1 sent from a first TRP (TRP 1). Thus, in this arrangement a second TRP (TRP 2) is not able to receive UL signals with the default spatial relation and pathloss RS.

The exemplary embodiments define default spatial relations and pathloss RS configurations for each of the scenarios described in Rel. 16 to support multi-TRP operation. The exemplary embodiments are applicable for multi-TRP cases when different values of CORESET-poolIndex are configured in the CORESETs in a CC. The scenarios and the exemplary embodiments are described in greater detail below.

In a first scenario, the spatial relation and pathloss reference signal for the PUCCH is not configured. In Rel. 16, when the CORESET is configured, the PUCCH spatial relation and pathloss is derived based on the reference signal indicated in a TCI state for a CORESET with a lowest ID in an active bandwidth part (BWP) on the same component carrier (CC). However, as described above, this solution is not applicable to multi-TRP operation.

According to a first exemplary embodiment, when the spatial relation and pathloss reference signal for PUCCH is not configured), PUCCH resources may be divided into N groups, e.g. N=2. The PUCCH resources within a particular group are configured to transmit data to a corresponding gNB.

In one embodiment, the grouping may be configured by higher layer signaling from the network, e.g. RRC signaling or a MAC Control Element (CE). In another embodiment, the grouping may be predefined. For example, when N=2, the first half of the PUCCH resources may belong to the first group while the second half may belong to the second group.

In this exemplary embodiment, if the spatial relation and pathloss reference signal for PUCCH resources within a group (e.g., group x) is not configured (e.g., signaled or preconfigured), the default spatial relation and pathloss reference signal for the PUCCH resources may be based on the reference signal in the TCI state for a CORESET with the lowest ID having the CORESET-PoolIndex set to y. The mapping between x and y may be configured by higher layer signaling, e.g. RRC signaling or a MAC Control Element (CE), or alternatively may be predefined, e.g. x=y.

In the network arrangement 300 described above, when implementing the first exemplary embodiment described above, TCI 1 may be used to determine a default spatial relation and pathloss reference signal for PUCCH resources in group 1. Meanwhile, TCI 2 may be used to determine a default spatial relation and pathloss reference signal for PUCCH resources in group 2. As described above, this example assumes that TCI 1 for group 1 and TCI 2 for group 2 was signaled to the UE using higher layer signaling or that these defaults are predefined for the UE.

According to a second exemplary embodiment, in the first scenario discussed above, various mechanisms for determining a default spatial relation and pathloss reference signal may be defined depending on the PUCCH resource configuration.

In one exemplary embodiment, for an aperiodic PUCCH resource, when the spatial relation and pathloss reference signal is not configured, the default spatial relation and pathloss reference signal for the PUCCH resources may be based on the reference signal in the TCI state for the scheduling PDCCH.

According to another exemplary embodiment (for aperiodic PUCCH), the default spatial relation and pathloss reference signal for the PUCCH resources may be based on the reference signal in the TCI state in a CORESET with a lowest ID with the same value of the CORESET-poolIndex as that carrying the scheduling PDCCH.

Figure 4A:
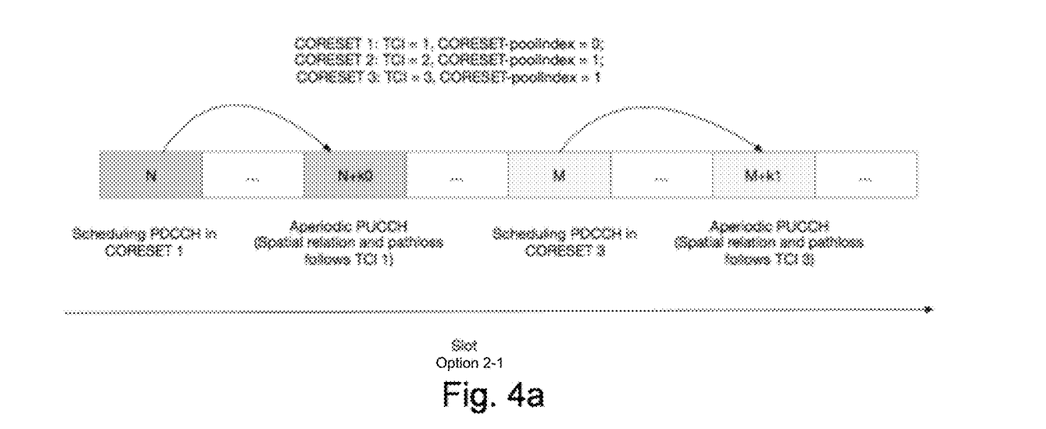
FIGS. 4a-4b show scheduling diagrams for multi-TRP UL resource configurations according to various exemplary embodiments described herein.
Figure 4B:
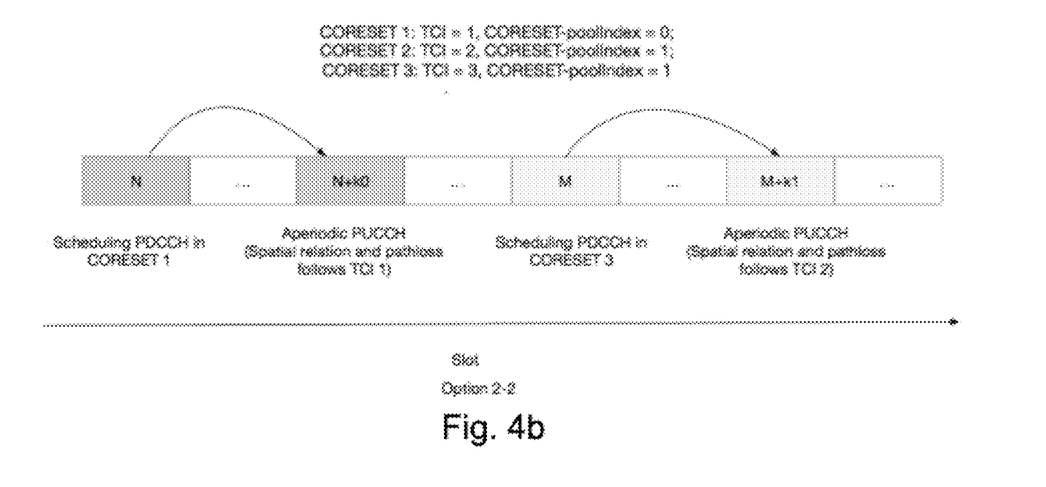

FIGS. 4a-4b show scheduling diagrams for the above-described embodiments. In the examples of FIGS. 4a-4b, it may be considered that there are three (3) configured CORESETS as follows: CORESET 1 having TCI=1 and a CORESET-poolIndex=0; CORESET 2 having TCI=2 and a CORESET-poolIndex=1; and CORESET 3 having TCI=3 and a CORESET-poolIndex=1.

In the first scheduling diagram 400, the default spatial relation and pathloss reference signal for the PUCCH resources is based on the reference signal in the TCI state for the scheduling PDCCH. PDCCH (N) is shown in CORESET 1. Thus, the default spatial relation and pathloss reference signal for the PUCCH resources in the aperiodic PUCCH (N+k0) is based on TCI 1. Similarly, PDCCH (M) is shown in CORESET 3. Thus, the default spatial relation and pathloss reference signal for the PUCCH resources in the aperiodic PUCCH (M+k1) is based on TCI 3.

In the second scheduling diagram 450, the default spatial relation and pathloss reference signal for the PUCCH resources is based on the reference signal in the TCI state in a CORESET with a lowest ID with the same value of CORESET-poolIndex as that carrying scheduling PDCCH. PDCCH (N) is shown in CORESET 1. In the example, CORESET 1 is the only CORESET that has a CORESET-poolIndex=0. Thus, the default spatial relation and pathloss reference signal for the PUCCH resources in the aperiodic PUCCH (N+k0) is based on TCI 1 corresponding to CORE- SET 1. PDCCH (M) is shown in CORESET 3. Since CORESET 3 and CORSET 2 have the same CORESET-poolIndex=1 and CORESET 2 has a lower ID, the default spatial relation and pathloss reference signal for the PUCCH resources in the aperiodic PUCCH (M+k1) is based on TCI 2.

In another exemplary embodiment related to a semi-persistent PUCCH resource, when the spatial relation and pathloss reference signal is not configured, the default spatial relation and pathloss reference signal for the PUCCH resources may be based on the reference signal in the TCI state in a CORESET with a lowest ID with the same value of the CORESET-poolIndex as that carrying scheduling PDCCH of the activation MAC CE.

In another exemplary embodiment related to a periodic PUCCH resource, if the spatial relation and pathloss reference signal is not configured, the default spatial relation and pathloss reference signal for the PUCCH resources may be based on the reference signal in the TCI state in a CORESET with a lowest ID in the latest slot.

Thus, the above exemplary embodiments provide various manners of determining a default spatial relation and pathloss reference signal for the PUCCH resources in the first scenario when a UE is in multi-TRP state.

In a second scenario, the spatial relation and pathloss reference signal for the SRS is not configured. In Rel. 16, similar to the first scenario above for the PUCCH, the SRS spatial relation and pathloss is derived, when a CORESET is configured, based on the reference signal indicated in a TCI state for a CORESET with a lowest ID in an active bandwidth part (BWP) on the same component carrier (CC). When the CORESET is not configured, the active TCI state with a lowest ID may be used to derive default spatial relation information. The second scenario is applicable for SRS for codebook or antenna switching or non-codebook when an associated CSI-RS is not configured. However, once again, these defaults for Rel. 16 are not applicable for a UE in a multi-TRP state for the reasons described above.

A third exemplary embodiment, similar to the first exemplary embodiment discussed above, may be applied to the second scenario where the spatial relation and pathloss reference signal for SRS is not configured for a UE in a multi-TRP state. In this example, SRS resources or resource sets may be divided into N groups. If the spatial relation and pathloss reference signal for SRS resources or resource sets within group x is not configured, the default spatial relation and pathloss reference signal for the SRS resources may be based on the reference signal in the TCI state for a CORESET with lowest ID in an active bandwidth part (BWP) on the same component carrier (CC) with CORESET-PoolIndex set to y.

If there is no CORESET configured, the default spatial relation and pathloss reference signal for the SRS resources may be based on the reference signal in the activated TCI state with lowest ID in TCI state group y. The mapping between x and y may be configured by higher layer signaling, e.g. RRC signaling or MAC Control Element (CE). Alternatively the mapping between x and y may be pre-defined, e.g. x=y.

In a further exemplary embodiment that is applicable to the second scenario, various mechanisms for determining a default spatial relation and pathloss reference signal may be defined depending on the SRS resource configuration. For example, the default spatial relation and pathloss RS may be determined by a CORESET TCI state with CORESET-poolIndex y or a TCI state with a lowest ID from a TCI state group y. For aperiodic SRS, y may be determined by the CORESET of the scheduling PDCCH. For semi-persistent SRS, y may be determined by the CORESET of a scheduling PDCCH of the activation MAC CE. For periodic SRS, y may be predefined or configured by higher layer signaling for periodic SRS.

Thus, the above exemplary embodiments provide various manners of determining a default spatial relation and pathloss reference signal for the SRS resources in the second scenario when a UE is in multi-TRP state.

In a third scenario, there is no PUCCH resource configured in a bandwidth part (BWP). In Rel. 16, if the PUSCH is scheduled by a PDCCH in DCI format 0_0, the PUCCH spatial relation and pathloss is derived based on the reference signal indicated in a TCI state for a Control Resource Set (CORESET) with lowest ID in active BWP on the same component carrier (CC). When there is no CORESET configured, the active TCI state with lowest ID may be used to derive default spatial relation info. However, once again, these defaults for Rel. 16 are not applicable for a UE in a multi-TRP state for the reasons described above.

A fifth exemplary embodiment is related to the third scenario where there is no PUCCH resource configured in the active BWP on the same CC and the PUSCH is scheduled by the PDCCH in DCI format 0_0) for a UE in a multi-TRP state. In this exemplary embodiment, the default spatial relation and pathloss RS for the PUSCH is determined based on the reference signal in a TCI state in a CORESET with lowest ID in an active bandwidth part (BWP) on the same component carrier (CC) with the CORESET-poolIndex=y. In various embodiments, y may be configured by higher layer signaling, predefined, or determined by the CORESET-poolIndex for the CORESET of the scheduling PDCCH.

Thus, the above exemplary embodiments provide various manners of determining a default spatial relation and pathloss reference signal for the SRS resources in the second scenario when a UE is in multi-TRP state.

Figure 5:
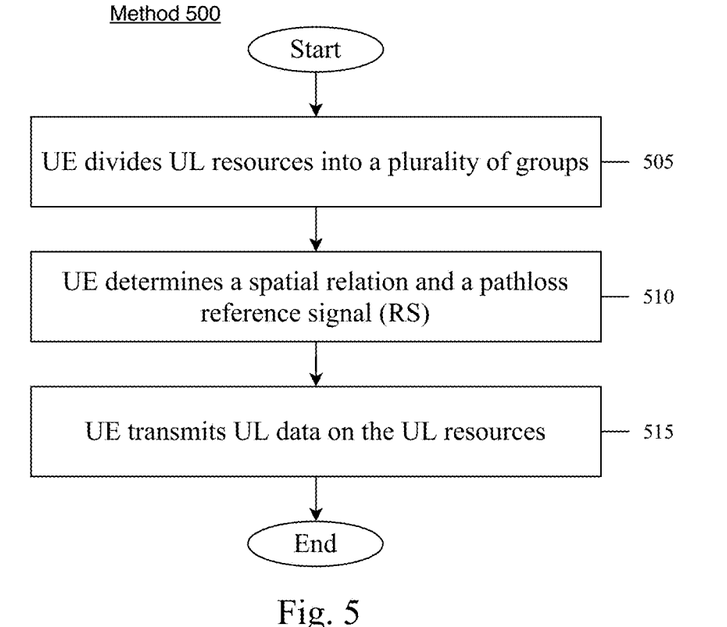
FIG. 5 shows a method for determining default spatial relation and pathloss reference signal (RS) configurations for uplink (UL) transmissions divided into a plurality of groups at a user equipment (UE) in a multiple transmission and reception point (multi-TRP) operation according to various exemplary embodiments described herein.

FIG. 5 shows a method 500 for determining a default spatial relation and pathloss reference signal (RS) configurations for uplink (UL) transmissions divided into a plurality of groups at a user equipment (UE) in a multiple transmission and reception point (multi-TRP) operation according to various exemplary embodiments described herein.

In 505, the UE divides UL resources into a plurality of groups. As discussed above, the grouping of the UL resources, e.g. PUCCH or SRS resources, may be configured by higher layer signaling or predefined.

In 510, the UE determines a spatial relation and a pathloss reference signal (RS) for each one of the plurality of groups based on a transmission configuration indication (TCI) indicating a quasi-co-location (QCL) source RS for a downlink channel. As discussed above, the QCL source RS may be a synchronization signal block (SSB) or a channel state information reference signal (CSI-RS) and include an antenna port identifier (ID). The default spatial relation and pthloss RS may be based on a reference signal in a TCI state for a control resource set (CORESET) with a lowest ID with a CORESET pool index set to y, wherein a mapping between x and y is either one of configured by higher layer signaling or predefined.

In 515, the UE transmits UL data on the UL resources corresponding to each one of the plurality of groups to a respective one of gNBs in the multi-TRP configuration.

Figure 6:
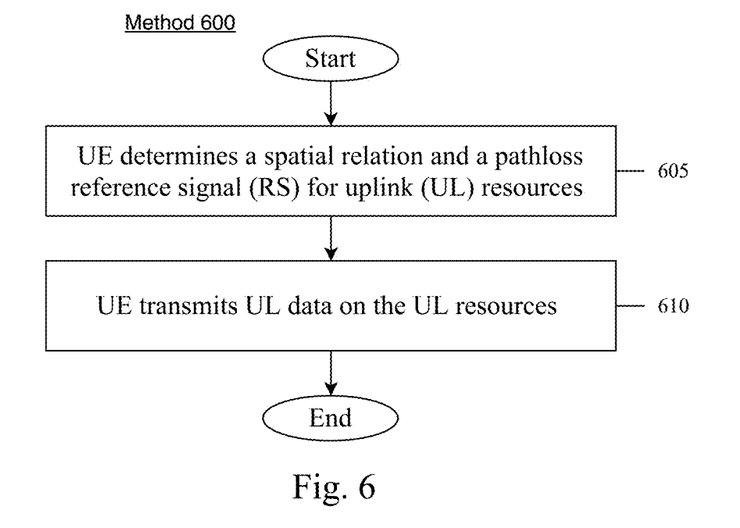
FIG. 6 shows a method for determining default spatial relation and pathloss reference signal (RS) configurations for uplink (UL) transmissions based on a time domain behavior of the UL resources at a user equipment (UE) in a multiple transmission and reception point (multi-TRP) operation according to various exemplary embodiments described herein.

FIG. 6 shows a method 600 for determining default spatial relation and pathloss reference signal (RS) configurations for uplink (UL) transmissions based on a time domain behavior of the UL resources at a user equipment (UE) in a multiple transmission and reception point (multi-TRP) operation according to various exemplary embodiments described herein.

In 605, the UE determines a spatial relation and a pathloss reference signal (RS) for uplink (UL) resources based on a transmission configuration indication (TCI) indicating a quasi-co-location (QCL) source RS for a downlink channel and a time domain behavior of the UL resources. For example, the time domain behavior may be aperiodic, semi-persistent, or periodic. The default parameters may be different depending on the time domain behavior, as discussed in detail above.

In 610, the UE transmits UL data on the UL resources to each one of the plurality of gNBs in the multi-TRP configuration.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A method, comprising:
   at a user equipment (UE) in a multiple transmission and reception point (multi-TRP) configuration having simultaneous connections with a first next generation node B (gNB) and at least one second gNB over a same carrier:
   dividing uplink (UL) resources into a plurality of groups;
   determining a spatial relation and a pathloss reference signal (RS) for each one of the plurality of groups based on a transmission configuration indication (TCI) indicating a quasi-co-location (QCL) source RS for a downlink channel, wherein, when the spatial relation and the pathloss RS for the UL resources is not configured for group x in the plurality of groups, a default spatial relation and a default pathloss RS for the UL resources is based on a reference signal in a TCI state for a control resource set (CORESET) with a lowest ID in an active bandwidth part (BWP) on the same component carrier (CC) with a CORESET pool index set to y, wherein a mapping between x and y is either one of configured by higher layer signaling or predefined; and
   transmitting UL data on the UL resources corresponding to each one of the plurality of groups to a respective one of the first gNB or the at least one second gNB.

2. The method of claim 1, wherein the uplink resources comprise either one of physical uplink control channel (PUCCH) resources or sounding reference signal (SRS) resources.

3. The method of claim 1, wherein the QCL source RS is one of a synchronization signal block (SSB) or a channel state information reference signal (CSI-RS).

4. The method of claim 1, wherein the QCL source RS includes an antenna port identifier (ID).

5. The method of claim 1, wherein the dividing the UL resources into the plurality of groups is configured by higher layer signaling.

6. The method of claim 5, wherein the higher layer signaling comprises radio resource control (RRC) signaling or a media access control (MAC) control element (CE).

7. The method of claim 1, wherein the dividing the UL resources into the plurality of groups is predefined.

8. A user equipment (UE), comprising:
   a transceiver configured to simultaneously connect with a first next generation node B (gNB) and at least one second gNB over a same carrier in a multiple transmission and reception point (multi-TRP) configuration; and
   a processor configured to:
   divide uplink (UL) resources into a plurality of groups, and
   determine a spatial relation and a pathloss reference signal (RS) for each one of the plurality of groups based on a transmission configuration indication (TCI) indicating a quasi-co-location (QCL) source RS for a downlink channel wherein, the processor is further configured to, when the spatial relation and the pathloss RS for the UL resources is not configured for group x in the plurality of groups, determine a default spatial relation and a default pathloss RS for the UL resources based on at least a reference signal in a TCI state for a control resource set (CORESET) with a lowest ID in an active bandwidth part (BWP) on the same component carrier (CC) with a CORESET pool index set to y, wherein a mapping between x and y is either one of configured by higher layer signaling or predefined,
   wherein the transceiver is further configured to transmit UL data on the UL resources corresponding to each one of the plurality of groups to a respective one of the first gNB or the at least one second gNB.

9. The UE of claim 8, wherein the uplink resources comprise either one of physical uplink control channel (PUCCH) resources or sounding reference signal (SRS) resources.

10. The UE of claim 8, wherein the QCL source RS is one of a synchronization signal block (SSB) or a channel state information reference signal (CSI-RS).

11. A method, comprising:
    at a user equipment (UE) in a multiple transmission and reception point (multi-TRP) configuration having simultaneous connections with a first next generation node B (gNB) and at least one second gNB over a same carrier:

determining a spatial relation and a pathloss reference signal (RS) for uplink (UL) resources based on a transmission configuration indication (TCI) indicating a quasi-co-location (QCL) source RS for a downlink channel and a time domain behavior of the UL resources wherein, when there is no Physical Uplink Control Channel (PUCCH) resource configured in an active bandwidth part (BWP) on a component carrier (CC) and the Physical Uplink Shared Channel (PUSCH) is scheduled by the Physical Downlink Control Channel (PDCCH) in DCI format 0_0, the spatial relation and pathloss RS for the PUSCH is based on at least a reference signal in a TCI state in a CORESET with lowest ID in the BWP on the same CC with the CORESET-poolIndex=y; and transmitting UL data on the UL resources to each one of the first gNB and the at least one second gNB.

12. The method of claim 11, wherein the time domain behavior of the UL resources is aperiodic, wherein a default spatial relation and a default pathloss RS for the UL resources is based on a reference signal in a TCI state for a scheduling physical downlink control channel (PDCCH).

13. The method of claim 11, wherein the time domain behavior of the UL resources is aperiodic, wherein a default spatial relation and a default pathloss RS for the UL resources is based on a reference signal in a TCI state in a control resource set (CORESET) with a lowest ID in an active bandwidth part (BWP) on the same component carrier (CC) having a same value of CORESET-poolindex as that carrying a scheduling physical downlink control channel (PDCCH).

14. The method of claim 11, wherein the time domain behavior of the UL resources is semi-persistent, wherein a default spatial relation and a default pathloss RS for the UL resources is based on a reference signal in a TCI state in a control resource set (CORESET) with a lowest ID in an active bandwidth part (BWP) on the same component carrier (CC) having a same value of CORESET-poolindex as that carrying a scheduling PDCCH of an activation media access control (MAC) control element (CE).

15. The method of claim 11, wherein the time domain behavior of the UL resources is periodic.

* * * * *